(12) United States Patent
Yoon et al.

(10) Patent No.: US 9,178,602 B2
(45) Date of Patent: Nov. 3, 2015

(54) REPEATER

(75) Inventors: Eung-sik Yoon, Suwon-si (KR); Sun-ho Yang, Seoul (KR); Cheon-seong Lee, Yongin-si (KR); Tae-don Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 13/487,732

(22) Filed: Jun. 4, 2012

(65) Prior Publication Data

US 2012/0307711 A1 Dec. 6, 2012

Related U.S. Application Data

(60) Provisional application No. 61/503,864, filed on Jul. 1, 2011, provisional application No. 61/493,007, filed on Jun. 3, 2011.

(30) Foreign Application Priority Data

Oct. 19, 2011 (KR) .......................... 10-2011-0107233

(51) Int. Cl.
*H04B 7/155* (2006.01)
(52) U.S. Cl.
CPC ........ *H04B 7/15507* (2013.01); *H04B 7/15542* (2013.01)
(58) Field of Classification Search
CPC .............................. H04W 7/2606; H04W 7/714
USPC .......................................................... 370/315
See application file for complete search history.

(56) References Cited

U.S. PATENT DOCUMENTS

| | | | |
|---|---|---|---|
| 5,640,694 A | 6/1997 | Milton, Jr. | |
| 5,733,831 A | 3/1998 | Takada et al. | |
| 6,584,080 B1* | 6/2003 | Ganz et al. | 370/315 |
| 7,953,383 B2 | 5/2011 | Cho et al. | |
| 8,131,209 B1 | 3/2012 | Chen et al. | |
| 2002/0048071 A1* | 4/2002 | Suzuki et al. | 359/173 |
| 2004/0267896 A1 | 12/2004 | Patel et al. | |
| 2006/0041680 A1 | 2/2006 | Procter, Jr. et al. | |
| 2006/0097574 A1 | 5/2006 | Gidge et al. | |
| 2006/0098592 A1 | 5/2006 | Proctor Jr. et al. | |
| 2006/0171445 A1 | 8/2006 | Batra et al. | |
| 2006/0223439 A1* | 10/2006 | Pinel et al. | 455/11.1 |
| 2008/0159376 A1 | 7/2008 | Yamaguchi | |

(Continued)

FOREIGN PATENT DOCUMENTS

EP 2030331 11/2007

OTHER PUBLICATIONS

Communication dated Apr. 4, 2014 issued by the United States Patent and Trademark Office in counterpart U.S. Appl. No. 13/487,515.

(Continued)

*Primary Examiner* — Shaq Taha
(74) *Attorney, Agent, or Firm* — Sughrue Mion, PLLC

(57) ABSTRACT

A repeater and method of controlling thereof are provided. The repeater includes: a first interface unit which is configured to be connected to a gateway apparatus via a Wi-Fi communication protocol; and a second interface unit which is configured to be connected to a client device via the Wi-Fi communication protocol, wherein at least one of the first and second interface units comprises a filter which filters different frequency bands.

16 Claims, 13 Drawing Sheets

(56) References Cited

U.S. PATENT DOCUMENTS

| | | | |
|---|---|---|---|
| 2008/0205261 A1* | 8/2008 | Mohebbi | 370/210 |
| 2009/0291632 A1* | 11/2009 | Braithwaite et al. | 455/7 |
| 2009/0323713 A1 | 12/2009 | Futch et al. | |
| 2010/0040178 A1* | 2/2010 | Sutton et al. | 375/345 |
| 2010/0159859 A1* | 6/2010 | Rofougaran | 455/131 |
| 2010/0197235 A1* | 8/2010 | Wilhelmsson | 455/63.3 |
| 2010/0197317 A1 | 8/2010 | Sadek et al. | |
| 2010/0240302 A1 | 9/2010 | Buczkiewicz et al. | |
| 2010/0296404 A1 | 11/2010 | Quadri et al. | |
| 2010/0309828 A1 | 12/2010 | Nguyen et al. | |
| 2011/0085477 A1* | 4/2011 | Schiff | 370/279 |
| 2011/0150123 A1 | 6/2011 | Han et al. | |
| 2011/0299444 A1* | 12/2011 | Rofougaran | 370/310 |
| 2012/0156989 A1* | 6/2012 | Rofougaran | 455/20 |

OTHER PUBLICATIONS

Communication dated Nov. 14, 2014, issued by the United States Patent and Trademark Office in U.S. Appl. No. 13/487,515.
Communication from the European Patent Office issued Jun. 9, 2015 in a counterpart European Application No. 12159847.8.
Communication from the European Patent Office issued Jun. 9, 2015 in a counterpart European Application No. 12159843.7.
USPTO Office Action dated May 22, 2015 issued in co-pending U.S. Appl. No. 13/487,515.

* cited by examiner

FIG. 10

| Channel No | Ch Bonding | CENTER FREQUENCY(MHz) | BANDWIDTH(MHz) |
|---|---|---|---|
| 36 | Y | 5180 | ±10 |
| 40 |   | 5200 | ±10 |
| 44 | Y | 5220 | ±10 |
| 48 |   | 5240 | ±10 |
| 52 | Y | 5260 | ±10 |
| 56 |   | 5280 | ±10 |
| 60 | Y | 5300 | ±10 |
| 64 |   | 5320 | ±10 |
| 100 | Y | 5500 | ±10 |
| 104 |   | 5520 | ±10 |
| 108 | Y | 5540 | ±10 |
| 112 |   | 5560 | ±10 |
| 116 | Y | 5580 | ±10 |
| 120 |   | 5600 | ±10 |
| 124 | Y | 5620 | ±10 |
| 128 |   | 5640 | ±10 |
| 132 | N | 5660 | ±10 |
| 136 | Y | 5680 | ±10 |
| 140 |   | 5700 | ±10 |
| 149 | Y | 5745 | ±10 |
| 153 |   | 5765 | ±10 |
| 157 | Y | 5785 | ±10 |
| 161 |   | 5800 | ±10 |
| 165 | N | 5825 | ±10 |

(a)

| Channel No | Ch Bonding | CENTER FREQUENCY(MHz) | BANDWIDTH (MHz) |
|---|---|---|---|
| 36 | Y | 5180 | ±10 |
| 40 |  | 5200 | ±10 |
| 44 | Y | 5220 | ±10 |
| 48 |  | 5240 | ±10 |
| 52 | Y | 5260 | ±10 |
| 56 |  | 5280 | ±10 |
| 60 | Y | 5300 | ±10 |
| 64 |  | 5320 | ±10 |
| 100 | Y | 5500 | ±10 |
| 104 |  | 5520 | ±10 |
| 108 | Y | 5540 | ±10 |
| 112 |  | 5560 | ±10 |
| 116 | Y | 5580 | ±10 |
| 120 |  | 5600 | ±10 |
| 124 | Y | 5620 | ±10 |
| 128 |  | 5640 | ±10 |
| 132 | N | 5660 | ±10 |
| 136 | Y | 5680 | ±10 |
| 140 |  | 5700 | ±10 |
| 149 | Y | 5745 | ±10 |
| 153 |  | 5765 | ±10 |
| 157 | Y | 5785 | ±10 |
| 161 |  | 5800 | ±10 |
| 165 | N | 5825 | ±10 |

(b)

| Channel No | Ch Bonding | CENTER FREQUENCY(MHz) | BANDWIDTH (MHz) |
|---|---|---|---|
| 36 | Y | 5180 | ±10 |
| 40 | Y | 5200 | ±10 |
| 44 | Y | 5220 | ±10 |
| 48 | Y | 5240 | ±10 |
| 52 | Y | 5260 | ±10 |
| 56 | Y | 5280 | ±10 |
| 60 | Y | 5300 | ±10 |
| 64 | Y | 5320 | ±10 |
| 100 | Y | 5500 | ±10 |
| 104 | Y | 5520 | ±10 |
| 108 | Y | 5540 | ±10 |
| 112 | Y | 5560 | ±10 |
| 116 | Y | 5580 | ±10 |
| 120 | Y | 5600 | ±10 |
| 124 | Y | 5620 | ±10 |
| 128 | Y | 5640 | ±10 |
| 132 | N | 5660 | ±10 |
| 136 | Y | 5680 | ±10 |
| 140 | Y | 5700 | ±10 |
| 149 | Y | 5745 | ±10 |
| 153 | Y | 5765 | ±10 |
| 157 | Y | 5785 | ±10 |
| 161 | Y | 5800 | ±10 |
| 165 | N | 5825 | ±10 |

REPEATER

CROSS-REFERENCE TO RELATED APPLICATION

This application claims priority from U.S. Provisional Application Nos. 61/493,007, filed on Jun. 3, 2011 and No. 61/503,864, filed on Jul. 1, 2011, in the United States Patent and Trademark Office, and Korean Patent Application No. 10-2011-0107233, filed on Oct. 19, 2011, in the Korean Intellectual Property Office, the disclosures of which are incorporated herein by reference in their entireties.

BACKGROUND

1. Field

Apparatuses and methods consistent with exemplary embodiments relate to a repeater, and more particularly, to a repeater which transmits and receives a broadcast signal between a gateway apparatus and a client device.

2. Description of the Related Art

With the development of wireless communication technology, a repeater has been frequently used to extend a transmission distance between transmitting and receiving systems. As the transmission distance increases between the transmitting and receiving systems, a signal transmitted from the transmitting system becomes weaker. Therefore, the repeater amplifies the signal received from the transmitting system and transmits the amplified signal to the receiving system.

A related art repeater uses the same channel to transmit a signal to transmitting and receiving systems. However, if the related art repeater uses the same channel, a data transmission rate is reduced to half.

Accordingly, a method of extending a transmission distance of data and uniformly maintaining a transmission rate of the data is required.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a repeater which uses channels within different frequency bands and filters the different frequency bands to remove system noise.

According to an aspect of an exemplary embodiment, there is provided a repeater including: a first interface unit which is configured to be connected to a gateway apparatus via a Wi-Fi communication protocol; and a second interface unit which is configured to be connected to a client device via to the Wi-Fi communication protocol, wherein at least one of the first and second interface units includes a filter which filters different frequency bands.

The different frequency bands may be in an Industrial, Scientific and Medical (ISM) frequency band.

The different frequency bands may include a frequency band higher than a dynamic frequency selection (DFS) frequency band and a frequency band lower than the DFS frequency band.

The different frequency bands may include a lower frequency band corresponding to the first interface unit and an upper frequency band corresponding to the second interface unit, wherein the lower and upper frequency bands respectively include channels of the DFS frequency band and channels of a non-DFS frequency band.

The first and second interface units may respectively communicate with the gateway apparatus and the client device via the different frequency bands.

The different frequency bands may respectively be in an Industrial, Scientific and Medical (ISM) frequency band higher than a DFS frequency band defined within a frequency band of 5 GHz and an ISM frequency band lower than the DFS frequency band.

The filter may include at least one band-pass filter (BPF) which filters the different frequency bands.

Each of the first and second interface units may further include at least one antenna which has a resonant frequency tuned to the different frequency bands.

The different frequency bands may respectively be in an Industrial, Scientific and Medical (ISM) frequency band higher than a DFS frequency band defined within a frequency band of 5 GHz and an ISM frequency band lower than the DFS frequency band; and the at least one antenna is a ceramic antenna having a Q value greater than a preset Q value.

The repeater may further include a shield which ground-shields the first and second interface units.

According to an aspect of another exemplary embodiment, there is provided a repeater including: first and second interface units which are respectively configured to communicate with a gateway apparatus and a client device via channels within a particular frequency band which is defined according to a Wi-Fi communication protocol; a signal detector which is configured to detect a frequency usage state of the particular frequency band; and a controller wherein, if the frequency usage state of the particular frequency band detected by the signal detector indicates that the particular frequency band is being used, the controller controls at least one of the first and second interface units to use channels of a different frequency band, which is different from the particular frequency band.

The signal detector may be configured to detect a frequency usage state of the different frequency band; and if the signal detector detects a signal which uses a frequency within the different frequency band, the controller may control the first and second interface units to use a frequency band of the signal.

Channels of the different frequency band may use a first frequency band, which is spaced apart from a second frequency band, which is used by channels of the particular frequency band.

The particular frequency band may be in an Industrial, Scientific and Medical (ISM) frequency band within a frequency band of 5 GHz defined according to the Wi-Fi communication protocol; and the different frequency band is in a dynamic frequency selection (DFS) frequency band within a frequency band of 5 GHz defined according to the Wi-Fi communication protocol.

Each of the first and second interface units includes at least one band-pass filter (BPF) which filters the particular frequency band and the different frequency band.

Each of the first and second interface units includes at least one antenna which has a resonant frequency tuned to channels of the particular frequency band and channels of the different frequency band.

The repeater may further include a shield which ground-shields the first and second interface units.

According to an aspect of an exemplary embodiment, there is provided a method of controlling a repeater which communicates with a gateway apparatus via a first Wi-Fi connection, and which communicates with at least one client device via a second Wi-Fi connection, the method including: receiving a broadcast signal from the gateway apparatus, wherein the broadcast signal is received over a preset frequency band via the first Wi-Fi connection; and transmitting the received broadcast signal to a client device from among the at least one client device over a frequency band, which is different from the present frequency band, via the second Wi-Fi connection.

BRIEF DESCRIPTION OF THE DRAWING FIGURES

The above and/or other aspects will be more apparent by describing in detail exemplary embodiments, with reference to the accompanying drawings, in which:

FIG. 10 is a table illustrating channels used for wireless communications in an Industrial, Scientific and Medical (ISM) frequency band according to an exemplary embodiment;

DETAILED DESCRIPTION OF EXEMPLARY EMBODIMENTS

Figure 1:
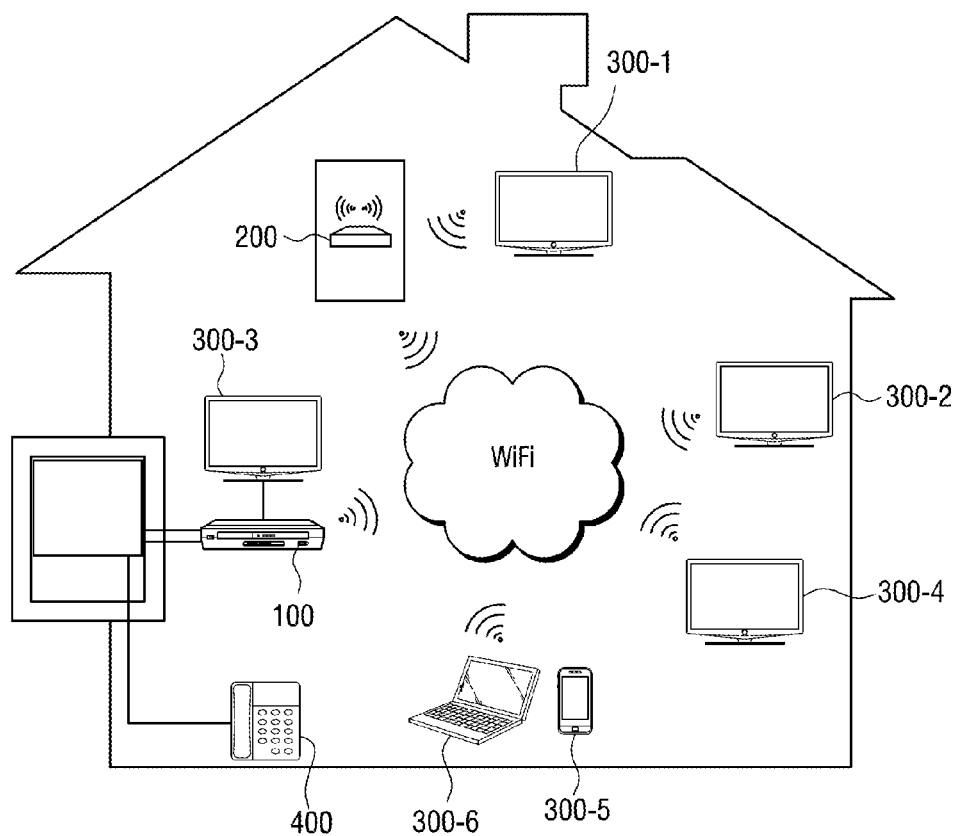
FIG. 1 is a view illustrating a home network system according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, exemplary embodiments may be carried out without those specifically defined matters. Also, functions or elements known in the related art may not be described in detail herein, as such description would obscure the exemplary embodiments with unnecessary detail.

FIG. 1 is a view illustrating a home network system according to an exemplary embodiment. Referring to FIG. 1, a broadcasting transmitting system 1000 according to the present exemplary embodiment includes a gateway apparatus 100, a repeater 200, and client devices 300-1, 300-2, 300-3, 300-4, 300-5, and 300-6.

The gateway apparatus 100 transmits various types of signals provided from an external device to the repeater 200 and the client devices 300-1, 300-2, 300-3, 300-4, 300-5, and 300-6 which are installed in a home.

In more detail, the gateway apparatus 100 may receive a digital cable broadcast signal (hereinafter referred to as a "broadcast signal") from an external device through a cable (not shown) via Quadrature Amplitude Modulation (QAM) and a data signal via Ethernet.

The gateway apparatus 100 may also transmit the broadcast signal to the repeater 200, which is connected according to a Wi-Fi communication protocol, by using a preset frequency band. Also, the gateway apparatus 100 may transmit the broadcast signal to the client devices 300-1, 300-2, 300-3, 300-4, 300-5, and 300-6, which are connected according to the Wi-Fi communication protocol, by using the preset frequency band.

Here, the preset frequency band may be included in a frequency band higher than a Dynamic Frequency Selection (DFS) frequency band which is defined according to the Wi-Fi communication protocol. Also, the preset frequency band may be included in a frequency band lower than the DFS frequency band which is defined according to the Wi-Fi communication protocol.

In more detail, the gateway apparatus 100 may transmit the broadcast signal to the repeater 200 and the client devices 300-1, 300-2, 300-3, 300-4, 300-5, and 300-6 by using an Industrial, Scientific and Medical (ISM) frequency band which is defined according to the Wi-Fi communication protocol. For this purpose, the gateway apparatus 100 may include a Wi-Fi communication module.

Here, the ISM frequency band refers to a frequency band which is established by the Federal Communications Commission (FCC), i.e., a frequency band of 2 GHz or 5 GHz among low power frequency bands between 902 MHz and 928 MHz, between 2.4 GHz and 2.4835 GHz, and between 5.15 GHz and 5.825 GHz which may be used by anyone without permission. Also, the DFS frequency band may refer to a frequency band between 5.225 GHz and 5.715 GHz which is included in the ISM frequency band, i.e., a frequency band which is used in applications such as military radar, weather radar, radio navigation radar, satellite radar, etc.

In particular, the gateway apparatus 100 according to the present exemplary embodiment may use a frequency band of 5 GHz among the ISM frequency bands. Also, the gateway apparatus 100 may transmit the broadcast signal by using an ISM frequency band higher than a DFS frequency band within the frequency band of 5 GHz or an ISM frequency band lower than the DFS frequency band.

The gateway apparatus 100 may transmit the broadcast signal and the data signal to the repeater 200 and the client devices 300-1, 300-2, 300-3, 300-4, 300-5, and 300-6 by using the cable. For this purpose, the gateway apparatus 100 may include an interface such as S-Video, component, composite, D-Sub, High Definition Multimedia Interface (HDMI), or the like.

The client devices 300-1, 300-2, 300-3, 300-4, 300-5, and 300-6 receive the broadcast signal or the data signal from the gateway apparatus 100 or the repeater 200 to perform functions respectively corresponding to the client devices 300-1, 300-2, 300-3, 300-4, 300-5, and 300-6.

For example, if the client devices 300-1, 300-2, 300-3, and 300-4 are digital televisions (TVs), the client devices 300-1, 300-2, 300-3, and 300-4 perform signal processing with respect to an image signal and an audio signal included in the broadcast signal received from the gateway apparatus 100 or the repeater 200 and provides the signal-processed image and audio signals to a user. Here, the client devices 300-1, 300-2, 300-3, and 300-4 may receive the broadcast signal from the gateway apparatus 100 or the repeater 200 in a wired or wireless way.

As another example, if the client devices 300-5 and 300-6 are mobile terminals or notebook computers, the client devices 300-5 and 300-6 may perform data communications with the gateway apparatus 100 or the repeater 200 by using the Wi-Fi communication protocol or the cable.

In the above-described embodiment, the client devices 300-1, 300-2, 300-3, 300-4, 300-5, and 300-6 are digital TVs, mobile terminals, or notebook computers, but this is only an exemplary embodiment. In other words, the client devices 300-1, 300-2, 300-3, 300-4, 300-5, and 300-6 may be display apparatuses such as desktop devices, portable multimedia players (PMPs), or the like.

The client devices 300-1, 300-2, 300-3, 300-4, 300-5, and 300-6 are to receive the broadcast signal to a fixed transmission rate (e.g., between 20 Mbps and 30 Mbps) in order to provide seamless digital broadcasting to the user.

However, when the broadcast signal is transmitted from the gateway apparatus 100 to the client devices 300-1, 300-2, 300-4, 300-5, and 300-6 wirelessly (e.g., via Wi-Fi), it may be difficult to secure the fixed transmission rate due to an obstacle such as a wall, which may be installed between the client devices 300-1, 300-2, 300-4, 300-5, 300-6 and the gateway apparatus 100.

Therefore, the repeater 200 amplifies and transmits the broadcast signal received from the gateway apparatus 100 in order to extend a transmission rate and a transmission distance of the broadcasting signal. In other words, the client device 300-1, which is positioned in an area in which the transmission rate of the broadcast signal received from the gateway apparatus 100 is lower than 20 Mbps (or 30 Mbps), e.g., a shadow area, may amplify and transmit the broadcasting signal.

In this case, the repeater 200 may transmit the broadcast signal to the client device 300-1 by using a frequency band different from a preset frequency band.

Here, the preset frequency band may refer to a frequency band which is used between the gateway apparatus 100 and the repeater 200.

Therefore, if the preset frequency band is included in an ISM frequency band higher than a DFS frequency band which is defined according to the Wi-Fi communication protocol, other frequency bands may be included in an ISM frequency band lower than the DFS frequency band. Also, if the preset frequency band is included in an ISM frequency band that is lower than the DFS frequency band which is defined according to the Wi-Fi communication protocol, other frequency bands may be included in an ISM frequency band that is higher than the DFS frequency band.

In other words, if the gateway apparatus 100 transmits the broadcast signal to the repeater 200 by using an IMS frequency band higher than a DFS frequency band within a frequency band of 5 GHz, the repeater 200 may transmit the broadcast signal to the client device 300-1 by using an ISM frequency band lower than the DFS frequency band. Also, if the gateway apparatus 100 transmits the broadcast signal to the repeater 200 by using an ISM frequency band that is lower than the DFS frequency band within the frequency band of 5 GHz, the repeater 200 may transmit the broadcast signal to the client device 300-1 by using an ISM frequency band that is higher than the DFS frequency band.

Thus, the repeater 200 may transmit the broadcast signal to the client device 300-1 using a frequency band that is different from a frequency band used between the gateway apparatus 100 and the repeater 200, and may thereby reduce adjacent channel interference.

For this purpose, the repeater 200 may include a station (STA) which receives the broadcast signal from the gateway apparatus 100 and an access point (AP) which transmits the broadcast signal received from the gateway apparatus 100 to the client device 300-1.

Also, as described above, the repeater 200 may differently operate a first Wi-Fi channel connected to the gateway apparatus 100 (i.e., a channel between the gateway apparatus 100 and the STA), and a second Wi-Fi channel connected to the client device 300-1 (i.e., a channel between the client device 300 and the AP).

In the above-described exemplary embodiment, one client device receives a broadcast signal through a repeater, but this is only an example. Therefore, a plurality of client devices may receive a broadcast signal through a repeater.

As shown in FIG. 1, the broadcasting transmitting and receiving system 1000 according to an exemplary embodiment may further include a wired terminal 400.

The wired terminal 400 may transmit and receive a voice signal with an external device by using a telephone line.

As described above, according to the present inventive concept, a broadcast signal or a data signal received from an external device is transmitted using a Wi-Fi communication protocol. Therefore, a user may be provided with a seamless digital broadcasting service in a desired place without installing an additional cable in the user's home.

Also, a repeater relays a broadcast signal between a gateway apparatus and a display apparatus by using channels in different frequency bands, thereby preventing a performance deterioration caused by channel interference.

Figure 2:
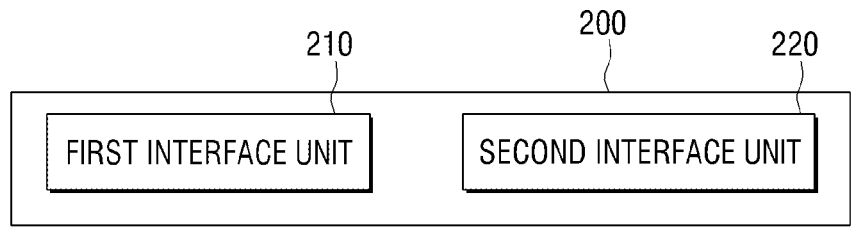
FIG. 2 is a block diagram illustrating a structure of a repeater according to an exemplary embodiment.

FIG. 2 is a block diagram illustrating a structure of a repeater 200 according to an exemplary embodiment. Referring to FIG. 2, the repeater 200 includes a first interface unit 210 and a second interface unit 220. The term "unit" as used herein means a hardware component, such as a processor or circuit, and/or a software component that is executed by a hardware component such as a processor.

The first interface unit 210 is connected to a gateway apparatus, according to a Wi-Fi communication protocol, to receive a broadcast signal from the gateway apparatus.

The second interface unit 220 is connected to a client device, also according to the Wi-Fi communication protocol, to transmit the broadcast signal to the client device.

For this purpose, the first and second interface units 210 and 220 may be respectively realized as Wi-Fi communication modules.

The first and second interface units 210 and 220 may use different frequency bands.

Here, the different frequency bands may include a lower frequency band corresponding to the first interface unit 210 and an upper frequency band corresponding to the second interface unit 220. The lower and upper frequency bands may be spaced apart from each other by the preset number of channels or by a preset frequency band. That is, the different frequency bands may be spaced apart from each other by the preset number of channels, or by a preset frequency band, in order to reduce inter-channel interference occurring between the first and second interface units 210 and 220.

In detail, the different frequency bands respectively used by the first and second interface units 210 and 220 are included in an ISM frequency band. In particular, the different frequency bands may include a frequency band that is higher than a DFS frequency band, and a frequency band that is lower than the DFS frequency band.

The different frequency bands may be included in an ISM frequency band within a frequency band of 5 GHz, which is defined according to the Wi-Fi communication protocol. The different frequency bands may be included in an ISM frequency band that is higher than a DFS frequency band defined within a frequency band of 5 GHz, and an ISM frequency band that is lower than the DFS frequency band.

In detail, if the first interface unit 210 receives the broadcast signal from the gateway apparatus by using an ISM frequency band higher than a DFS frequency band which is defined within a frequency band of 5 GHz defined according to the Wi-Fi communication protocol, the second interface unit 220 may transmit the broadcast signal to the client device by using an ISM frequency band lower than the DFS frequency band.

If the first interface unit 210 receives the broadcast signal from the gateway apparatus by using an ISM frequency band lower than a DFS frequency band, which is defined within a frequency band of 5 GHz defined according to the Wi-Fi communication protocol, the second interface unit 220 may transmit the broadcast signal to the client device by using an ISM frequency band higher than the DFS frequency band.

Here, the ISM frequency band higher than the DFS frequency band may refer to a frequency band between 5.725 GHz and 5.825 GHz (i.e., a frequency band of 5.8 GHz), and the ISM frequency band lower than the DFS frequency band may refer to a frequency band between 5.15 GHz and 5.25 GHz (i.e., a frequency band of 5.2 GHz).

Therefore, the first and second interface units 210 and 220 may transmit the broadcast signal from the gateway apparatus 100 to the client device 300 by using channels within different frequency bands even in a frequency band of 5 GHz, which is defined according to the Wi-Fi communication protocol.

The different frequency bands may include a lower frequency band corresponding to the first interface unit 210 and an upper frequency band corresponding to the second interface unit 220. Also, the lower and upper frequency bands may respectively include some channels within a DFS frequency band, and some channels within a non-DFS frequency band. The different frequency bands may include an upper frequency band corresponding to the first interface unit 210 and a lower frequency band corresponding to the second interface unit 220.

Also, the different frequency bands used by the first and second interface units 210 and 220 may be spaced apart from each other by the preset number of channels, or by a preset frequency band in order to reduce inter-channel interference with another repeater.

Frequency bands used by the first and second interface units 210 and 220 will be described in more detail later with reference to FIGS. 10, and 12 through 14.

If a data signal is transmitted, the first and second interface units 210 and 220 may relay the data signal between the gateway apparatus 100 and the client device 300 by using a frequency band of 2 GHz of an ISM frequency band, i.e., a frequency band between 2.4 GHz and 2.4835 GHz.

In the repeater 200 according to the present exemplary embodiment, transmitting and receiving systems use channels of different frequency bands. Therefore, the repeater 200 according to the present exemplary embodiment may include a filter, an antenna, a shield, etc., in order to remove wireless channel interference caused by using of different channels by the transmitting and receiving systems. This will be described in more detail with reference to FIGS. 3 through 7.

Figure 3:
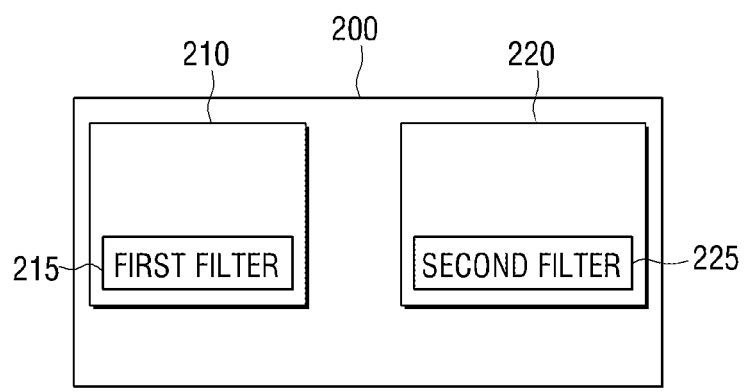
FIG. 3 is a block diagram illustrating a structure of a repeater according to another exemplary embodiment.

FIG. 3 is a block diagram illustrating a structure of a repeater 200 according to another exemplary embodiment. Referring to FIG. 3, the repeater 200 includes first and second interface units 210 and 220 and first and second filters 215 and 225. The reference numerals of FIG. 3 are the same as those of FIG. 2, and the corresponding components perform the same functions. Thus, repeated detailed descriptions will be omitted.

The first interface unit 210 is connected to a gateway apparatus according to a Wi-Fi communication protocol.

The second interface unit 220 is connected to a client device according to the Wi-Fi communication protocol.

The first and second interface units 210 and 220 may respectively communicate with the gateway apparatus and the client device by using different frequency bands. Here, the different frequency bands may be respectively included in an ISM frequency band higher than a DFS frequency band defined within a frequency band of 5 GHz and an ISM frequency band lower than the DFS frequency band. This has been described in detail hereinabove with reference to FIG. 2.

At least one of the first and second interface units 210 and 220 may include the first and second filters 215 and 225, which filter the different frequency bands to remove system noise. Here, the system noise may refer to interference which occurs from a transmitting system to a receiving system due to the use of channels of different frequency bands.

The first filter 215 of the first interface unit 210 filters a frequency band which is used for communication with the gateway apparatus. For this purpose, the first filter 215 may be realized as a band-pass filter (BPF), which is to filter only the frequency band used by the first interface unit 210.

The second filter 225 of the second interface unit 220 filters a frequency band which is used for communication with the client device. For this purpose, the second filter 225 also may be realized as a BPF, which is to filter only the frequency band used by the second interface unit 210.

Therefore, as the transmitting and receiving systems use channels of different frequency bands, a high output signal of the transmitting system is induced to the receiving system, and thus affects the receiving system as in-band noise.

In other words, if the second interface unit 220 transmits a broadcast signal to the client device by using an ISM frequency band higher than a DFS frequency band, a part of the transmitted broadcast signal is prevented from being induced to the first interface unit 210. Therefore, interference in the broadcast signal received from the gateway apparatus may be inhibited through the first interface unit 210. Therefore, an isolation performance of about 60 dB may be secured.

Figure 4:
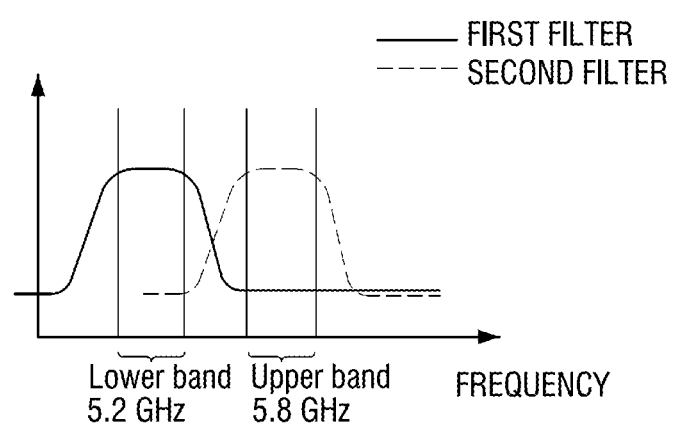
FIG. 4 is a graph illustrating characteristics of filters according to an exemplary embodiment.

FIG. 4 is a graph illustrating characteristics of filters according to an exemplary embodiment. In more detail, FIG. 4 illustrates filtering characteristics of the first and second filters 215 and 225 if the first interface unit 210 uses channels of an ISM frequency band lower than a DFS frequency band, and the second interface unit 220 uses channels of an ISM frequency band higher than the DFS frequency band, For example, as shown in FIG. 4, the first filter 215 may be realized as a BPF, which has a center frequency of 5.2 GHz and a bandwidth of 100 MHz, to filter only an ISM frequency band lower than the DFS frequency band. Also, the second filter 225 may be realized as a BPF, which has a center frequency of 5.775 GHz and a bandwidth of 100 MHz, to filter only an ISM frequency band higher than the DFS frequency band.

Accordingly, the first and second filters 215 and 225 may remove interference between the first and second interface units 210 and 220, respectively, using channels within different frequency bands to filter system noise.

In the above-described exemplary embodiment, the center frequency of the first filter 215 is 5.2 GHz, and the center frequency of the second filter 225 is 5.775 GHz, but this is only an exemplary embodiment. In other words, if the first interface unit 210 uses an ISM frequency band (e.g., an upper band) higher than a DFS frequency band, and the second interface unit 220 uses an ISM frequency band (e.g., a lower band) lower than the DFS frequency band, the first filter 215 may be realized as a BPF having a center frequency of 5.775 GHz, and the second filter 225 may be realized as a BPF having a center frequency of 5.2 GHz.

Figure 5:
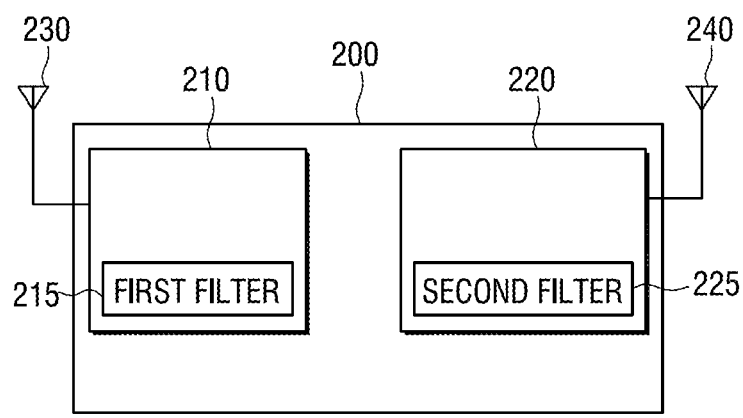
FIG. 5 is a block diagram illustrating a structure of a repeater according to another exemplary embodiment.

FIG. 5 is a block diagram illustrating a structure of a repeater 200 according to another exemplary embodiment. Referring to FIG. 5, the repeater 200 includes first and second interface units 210 and 220, first and second filters 215 and 225, and first and second antennas 230 and 240. The reference numerals of FIG. 5 are the same as those of FIGS. 2 and 3, and the corresponding components perform the same functions. Thus, repeated detailed descriptions will be omitted.

The first and second interface units 210 and 220 may respectively further include at least one antennas 230 and 240 in which have resonant frequencies which are tuned to different frequency bands.

Here, the different frequency bands may be respectively included in an ISM frequency band higher than a DFS frequency band defined within a frequency band of 5 GHz and an ISM frequency band lower than the DFS frequency band. Also, at least one of the first and second antennas 230 and 240 may be realized as a ceramic antenna having a Q value higher than a preset Q value. Hereinafter, this will be described in more detail with reference to FIG. 6.

Figure 6:
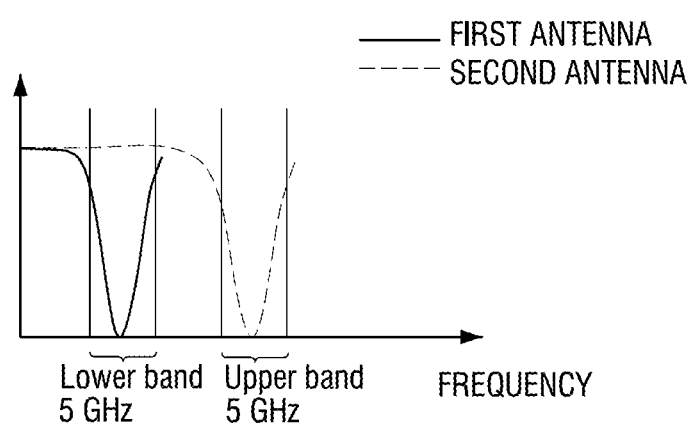
FIG. 6 is a graph illustrating characteristics of antennas according to an exemplary embodiment.

FIG. 6 is a graph illustrating characteristics of antennas according to another exemplary embodiment. In more detail, FIG. 6 illustrates characteristics of the first and second antennas 230 and 240 if the first interface unit 210 uses channels of an ISM frequency band (i.e., a lower band) lower than a DFS frequency band, and the second interface unit 220 uses channels of an ISM frequency band (i.e., an upper band) higher than the DFS frequency band.

For example, as shown in FIG. 6, the first antenna 230 may be realized as a high Q ceramic antenna which has high frequency selectivity with respect to an ISM frequency band lower than a DFS frequency band, i.e., a frequency band between 5.15 GHz and 5.25 GHz. The second antenna 240 may be realized as a high Q ceramic antenna which has high frequency selectivity with respect to an ISM frequency band higher than the DFS frequency band, i.e., a frequency band between 5.725 GHz and 5.825 GHz.

Therefore, resonant frequencies of antennas of transmitting and receiving systems may be limited. In other words, resonant frequencies of channels may be spaced apart from each other between the first and second interface units 210 and 220, which respectively use channels of different frequency bands, thereby securing an isolation effect of about 30 dB.

Figure 7:
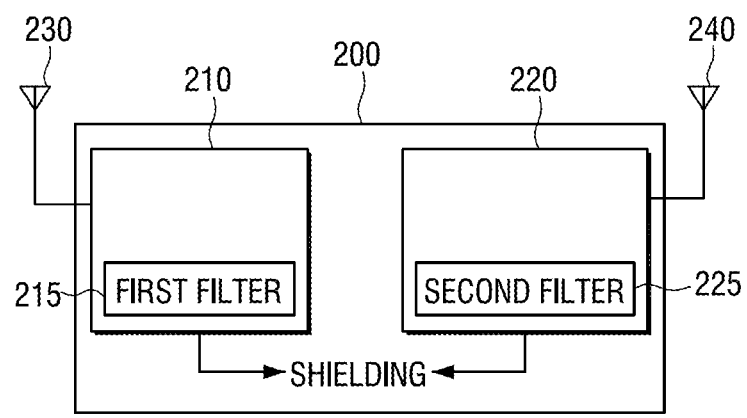
FIG. 7 is a block diagram illustrating a structure of a repeater according to another exemplary embodiment.

FIG. 7 is a block diagram illustrating a structure of a repeater 200 according to another exemplary embodiment. Referring to FIG. 7, the repeater 200 includes first and second interface units 210 and 220, first and second filters 215 and 225, and first and second antennas 230 and 240. The repeater 200 may further include a shield which ground-shields the first and second interface units 210 and 220, respectively. The reference numerals of FIG. 7 are the same as those of FIGS. 2, 3 and 5, and the corresponding components perform the same functions. Thus, repeated detailed descriptions will be omitted.

The repeater 200 according to the present exemplary embodiment may further include the shield which performs ground-shielding with respect to the first and second interface units 210 and 220, respectively. In more detail, the shield may be formed of a conductive material such as aluminum or the like to connect the first and second interface units 210 and 220 to the ground GND.

Therefore, high frequency noise occurring in transmitting and receiving systems may bypass to the ground to minimize interferences such as pattern coupling, air emission, ground noise. As a result, an isolation effect of about 10 dB may be secured between the first and second interface units 210 and 220 respectively using channels of different frequency bands.

In the above-described exemplary embodiment, the first and second interface units 210 and 220 are respectively ground-shielded to reduce interferences, but this is only an exemplary embodiment. In other words, printed circuit board (PCB) layers (e.g., a six-layer PCB) of the first and second interface units 210 and 220 may be additionally shielded to reduce interference between the first and second interface units 210 and 220.

The repeater 200 according to the present exemplary embodiment may secure an isolation effect of about 93 dB between the first and second interface units 210 and 220, which use channels of different frequency bands, by using the first and second filters 215 and 225, the first and second antennas 230 and 240, and the shield.

In the above-described exemplary embodiments, filters, antennas, and shielding processing are sequentially added to a repeater, but this is only an exemplary embodiment. Therefore, the filters, the antennas, and the shield processing may be individually added to the repeater, or combinations thereof may be added to the repeater. In other words, a repeater may be realized so as to include only filters, only antennas, or performing only ground-shielding. Alternatively, a repeater may be realized so as to include filters and perform ground-shielding.

Figure 8:
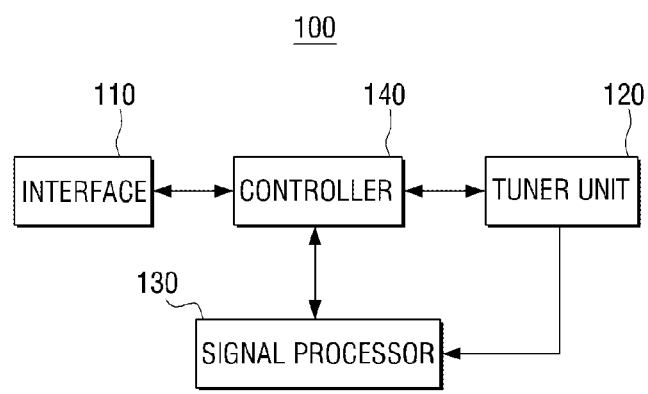
FIG. 8 is a block diagram illustrating a structure of a gateway apparatus according to an exemplary embodiment.

FIG. 8 is a block diagram illustrating a structure of a gateway apparatus 100 according to an exemplary embodiment. Referring to FIG. 8, the gateway apparatus 100 includes a first interface unit 110, a tuner unit 120, a signal processor 130, and a controller 140.

The interface unit 110 may be connected to a repeater according to a Wi-Fi communication protocol. In detail, the interface unit 110 may transmit a broadcast signal to the repeater by using an ISM frequency band that is higher than a DFS frequency band within a frequency band of 5 GHz defined according to the Wi-Fi communication protocol, or an ISM frequency band that is lower than the DFS frequency band. For this purpose, the interface unit 110 may include a Wi-Fi module.

Also, the interface unit 110 may be connected to at least one client device according to the Wi-Fi communication protocol or a wired communication protocol.

In detail, the interface unit 110 may transmit the broadcast signal to the client device by using an ISM frequency band that is higher than a DFS frequency band within a frequency band of 5 GHz defined according to the Wi-Fi communication protocol, or an ISM frequency band that is lower than the DFS frequency band. For this purpose, the interface unit 110 may include a Wi-Fi module.

Also, the interface unit 110 may include S-Video, component, composite, D-Sub, Digital Visual Interface (DVI), HDMI, or the like, to transmit the broadcast signal to the client device via a wired connection.

The interface unit 110 may receive a channel selecting command from the client device or the repeater. Here, the interface unit 110 may directly receive the channel selecting command from the client device. Also, if the interface unit 110 is connected to the client device through the repeater, the interface unit 110 may receive the channel selecting command which is requested by the client device through the repeater.

The tuner unit 120 receives the broadcast signal from an external device.

In detail, the tuner unit 120 may include a plurality of tuners (not shown) to select at least one of broadcasting signals which are received by via a wired or a wireless connection. In other words, if the channel selecting command is input from the repeater or the client device, the tuner unit 120 may select a channel according to the channel selecting command.

For example, if commands to select channels A, B and C are respectively input from a plurality of client devices, the tuner unit 120 may select the broadcast signal received from a corresponding channel from among the broadcasting signals received via a wired or a wireless connection.

Therefore, the tuner unit 120 may include the plurality of tuners.

For example, the tuner unit 120 may include six tuners. Here, three of the six tuners are used to select a broadcast signal which is provided to three client devices connected to the interface unit 110 according to the Wi-Fi communication protocol. Also, one of the other tuners is used to select a broadcast signal which is provided to one client device connected via an HDMI connection. Another one is used to select a broadcast signal which is provided to one client connected via a component connection (or via a composite connection). The other one is used to select a broadcast signal which is stored in a storage means (e.g., a hard disk drive (HDD)) of the gateway apparatus 100.

Here, the three client devices connected according to the Wi-Fi communication protocol may refer to client devices which are directly connected to the gateway apparatus 100 or connected to the gateway apparatus 100 through the repeater.

In the above-described exemplary embodiment, the tuner unit 120 includes six tuners, but this is only an example. In other words, the number of client devices connected according to the Wi-Fi communication protocol may be smaller than 3, and the number of client devices connected via a wire way may be greater than 2. Also, the tuner unit 120 may include two or more tuners to select a broadcast signal stored in the gateway apparatus. Therefore, the tuner unit 120 may include more or less than six tuners.

The tuner unit 120 may be realized to receive a broadcast signal from an external device (e.g., an external set-top box) which is connected through an external input unit (not shown).

The signal processor 130 processes a broadcast signal received through a channel selected by the tuner unit 120. In detail, the signal processor 130 converts a broadcast signal received through a selected channel into a Moving Picture Experts Group-2 (MPEG-2) Transport Stream (TS) format in order to transmit the broadcast signal to at least one client device which is connected according to the Wi-Fi communication protocol.

The signal processor 130 may decode the broadcast signal having the MPEG-2 format in order to transmit the broadcast signal to at least one client device connected according to a wired communication protocol. For this purpose, the signal processor 130 may include an MPEG-2 decoder.

The controller 140 controls overall operations of elements of the gateway apparatus 100.

The controller 140 allocates Internet Protocol (IP) connections to a plurality of client devices according to the Wi-Fi communication protocol, so as to perform wireless communications with the client devices and a repeater through the interface unit 110 according to the Wi-Fi communication protocol.

Also, if a channel selecting command is input from a client device connected wirelessly, or via a repeater, the controller 140 may control the tuner unit 120 to receive a broadcast signal from a corresponding channel and control the signal processor 130 to convert the broadcast signal into an MPEG-2 transport stream (TS) format.

The controller 140 may also control the interface unit 110 to transmit the broadcasting signal, which is processed by the signal processor 130, to the repeater by using a preset frequency band. Here, the preset frequency band may refer to an ISM frequency band within a frequency band of 5 GHz defined according to the Wi-Fi communication protocol. In detail, the preset frequency band may refer to an ISM frequency band higher than a DFS frequency band within a frequency band of 5 GHz or an ISM frequency band lower than the DFS frequency band.

Also, the controller 140 may control the interface unit 110 to directly transmit the broadcast signal processed by the signal processor 130 to the client device. Even in this case, the controller 140 may transmit the broadcast signal to the client device by using the ISM frequency band higher than the DFS frequency band within the frequency band of 5 GHz or the ISM frequency band lower than the DFS frequency band.

One channel may be defined to 20 GHz in the ISM frequency band or the DFS frequency band. Also, the controller 140 may transmit the broadcast signal to the repeater or the client device through two channels, i.e., through a frequency band of 40 GHz, by using channel bonding.

As described above, a transmission rate between 20 Mbps and 30 Mbps are to be secured in order to provide seamless broadcasting contents from the client device to a user. For this purpose, the controller 140 may transmit the broadcast signal by using a frequency band of 40 GHz and transmit the broadcast signal to three client devices to the maximum in order to satisfy the transmission rate between 20 Mbps and 30 Mbps.

If the controller 140 transmits a data signal to a plurality of client devices via Ethernet, the controller 140 may control the interface unit 110 to use a frequency band of 2 GHz used in the Wi-Fi communication protocol. In other words, the controller 140 may perform data communications with the plurality of client devices by using a frequency band between 2.4 GHz and 2.4835 GHz which is an ISM frequency band within a frequency band of 2 GHz.

If a channel selecting command is received from a client device connected via a wired connection, the controller 140 may control the tuner unit 120 to receive a broadcast signal from a corresponding channel. Also, the controller 140 may control the signal processor 130 to decode the broadcast signal having the MPEG-2 TS format and transmit the broadcast signal to the client device.

In the above-described exemplary embodiment, a broadcast signal having an MPEG-2 TS format is decoded and then transmitted to a client device connected via a wire. However, this is only an exemplary embodiment. In other words, a gateway apparatus may transmit a broadcast signal having an MPEG-2 TS formation to a client device, which is connected via a wire, without performing a decoding process.

The gateway apparatus 100 according to the present exemplary embodiment may further include a storage unit (not shown) which stores the broadcast signal received from the tuner unit 120. In other words, if a user command to store a broadcast signal is input from a client device or a repeater, the controller 140 may control the tuner unit 120 to receive a broadcast signal of a corresponding channel through at least one tuner of the tuner unit 120 and control the storage unit to store the received broadcasting signal.

The storage unit performing the above-described function may be realized as a nonvolatile memory such as an HDD, a flash memory, an Electrically Erasable and Programmable Read Only Memory (EEPROM), or the like.

If a command to transmit the stored broadcast signal is received from the client device through the interface unit 110, the controller 140 may control the signal processor 130 to perform signal processing with respect to the broadcast signal stored in the storage unit.

Figure 9:
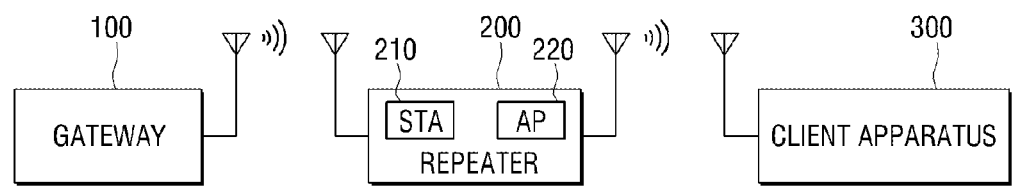
FIG. 9 is a view illustrating a method of transmitting a broadcast signal from a gateway apparatus to a client device through a repeater according to an exemplary embodiment.

FIG. 9 is a view illustrating a method of transmitting a broadcast signal from a gateway apparatus to a client device through a repeater according to an exemplary embodiment.

A repeater 200 transmits a channel selecting command, which is requested by a client device 300, to a gateway apparatus 100. The gateway apparatus 100 transmits a broadcast signal corresponding to the channel selecting command to the repeater 200. Here, the gateway apparatus 100 may transmit the broadcast signal in an MPEG-2 TS format.

The repeater 200 may include an STA 210 and an AP 220. Here, the STA 210 operates to receive the broadcast signal from the gateway apparatus 100, and the AP 220 operates to transmit the broadcast signal received from the gateway apparatus 100 to the client device 300.

The STA 210 and the AP 220 may receive the broadcast signal from the gateway apparatus 100 and transmit the broadcast signal to the client device 300, by using different channels of a frequency band of 5 GHz defined according to a Wi-Fi communication protocol.

For example, the STA 210 may receive the broadcast signal from the gateway apparatus 100 by using an ISM frequency band higher than a DFS frequency band within the frequency band of 5 GHz. Also, the AP 220 may transmit the broadcast signal to the client device 300 by using an ISM frequency band lower than the DFS frequency band.

As another example, the STA 210 may receive the broadcast signal from the gateway apparatus 100 by using an ISM frequency band lower than a DFS frequency band within a frequency band of 5 GHz. Also, the AP 220 may transmit the broadcast signal to the client device 300 by using an ISM frequency band higher than the DFS frequency band.

The client device 300 may process the broadcast signal received from the repeater 200 and provide the processed broadcast signal to a user.

In detail, the client device 300 may divide the broadcast signal having the MPEG-2 TS format into an image signal, an audio signal, and additional information and perform signal processing with respect to the image and audio signals. In other words, the client device 300 may perform signal processing, such as video decoding, video format analyzing, video scaling, audio decoding, or the like, with respect to the image and audio signals.

The client device 300 may provide the signal-processed broadcast signal to the user through a display unit (not shown) and an audio output unit (not shown) which are installed in the client device 300.

In the above-described exemplary embodiment, the repeater 200 is directly connected to the client device 300, but this is only an example. The repeater 200 and the client device 200 may be connected to each other through another repeater according to another exemplary embodiment.

FIG. 10 is a table illustrating channels used for wireless communications in an ISM frequency band according to an exemplary embodiment.

As shown in FIG. 10, a gateway apparatus, a repeater, and a client device may transmit and receive a broadcast signal by using a frequency band (between 5.725 GHz and 5.825 GHz) higher than a DFS frequency band within a frequency band of 5 GHz and a frequency band (between 5.15 GHz and 5.25 GHz) lower than the DFS frequency band.

In other words, a first interface unit of the repeater, which receives the broadcast signal from the gateway apparatus, may use a lower frequency band between 5.15 GHz and 5.25 GHz corresponding to the first interface unit. A second interface unit of the repeater, which transmits the broadcast signal to the client device, may use an upper frequency band between 5.725 GHz and 5.825 GHz corresponding to the second interface unit. Therefore, channels used by the first and second interface units may be spaced apart from each other by the preset number or a preset frequency band, thereby reducing inter-channel interference occurring between the first and second interface units.

In each of the upper and lower frequency bands, 20 MHz is defined as one channel. Therefore, if a guard band of each of the upper and lower frequency bands is excluded, the lower frequency band includes 4 channels, and the upper frequency band includes 5 channels. In other words, the lower frequency band includes channels Ch. 36 (hereinafter, a specific channel may be abbreviated as "Ch." (e.g., "Ch. 40")), Ch. 40, Ch. 44, Ch. 48 which respectively have bandwidths of 20 MHz and center frequencies 5180 MHz, 5200 MHz, 5220 MHz, and 5240 MHz. Also, the upper frequency band includes channels Ch. 149, Ch. 153, Ch. 157, Ch. 161 and Ch. 165 which respectively have bandwidths of 20 MHz and center frequencies 5745 MHz, 5765 MHz, 5785 MHz, 5800 MHz, and 5825 MHz.

According to an exemplary embodiment, as described above, a broadcast signal transmitted from a gateway apparatus to a repeater or a client device is to secure a transmission rate of a minimum of 60 Mbps in order to provide seamless digital broadcasting to three client devices to the maximum extent by wireless communications. Therefore, the gateway apparatus, the repeater, and the client device may bind two adjacent channels within an upper or lower frequency band to use a bandwidth of 40 MHz in order to transmit and receive a broadcasting signal.

In other words, as shown in FIG. 10, two adjacent channels, i.e., channels 36 and 40 or channels 44 and 48, may be used in a lower frequency band, and two adjacent channels, i.e., channels 149 and 153 or channels 157 and 161 may be used in an upper frequency band.

Figure 11:
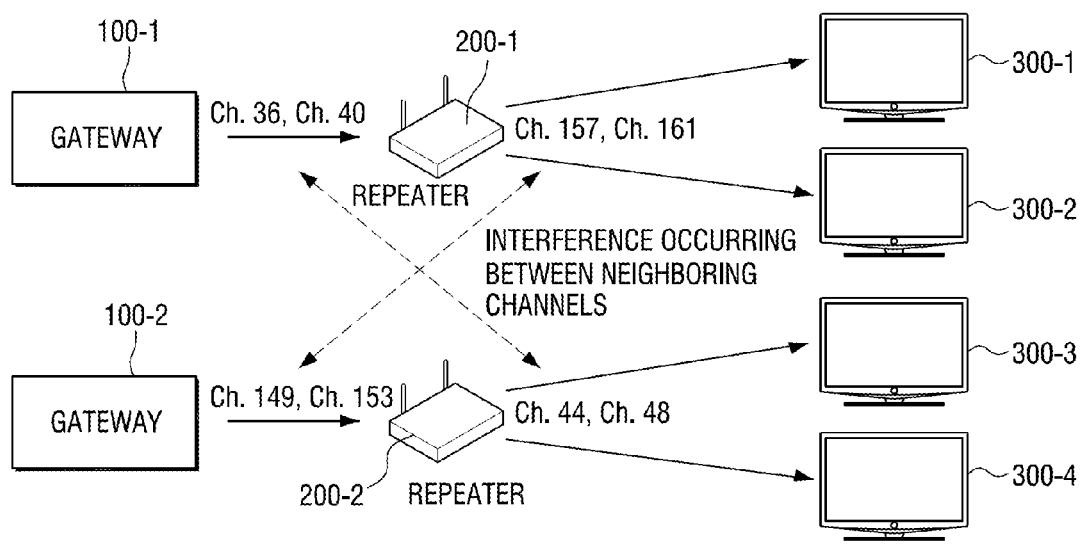
FIG. 11 is a view illustrating an adjacent channel interference occurring if two repeaters using different channels are used.

FIG. 11 is a view illustrating an inter-channel interference which may occur if two repeaters having different channels are used.

As described with reference to FIG. 10, a gateway apparatus, a repeater, and a client device bind two adjacent channels within an upper or lower band to use a bandwidth of 40 MHz in order to transmit and receive a broadcasting signal. Therefore, if a broadcasting transmitting system simultaneously uses two or more repeaters, interference may occur between adjacent channels.

For example, as shown in FIG. 11, a repeater 200-1 receives a broadcast signal from a gateway apparatus 100-1 by using channels Ch. 36 and Ch. 40 and transmits the broadcast signal to client devices 300-1 and 300-2 by using channels Ch. 157 and Ch. 161. A repeater 200-2 receives a broadcast signal from a gateway apparatus 200-2 by using channels Ch. 149 and Ch. 153 and transmits the broadcast signal to clients 300-3 and 300-4 by using channels Ch. 44 and Ch. 48.

In this case, the repeater 200-1 and the gateway apparatus 100-1, and the repeater 200-2 and the client devices 300-3 and 300-4 use adjacent channels. Also, the repeater 200-1 and the client devices 300-1 and 300-2, and the repeater 200-2 and the gateway apparatus 100-2 use adjacent channels. Therefore, interference may occur between the adjacent channels.

In order to solve this problem, a repeater according to an exemplary embodiment may receive and transmit a broadcast signal by using a frequency band other than an ISM frequency band, i.e., a DFS frequency band. A repeater according to an exemplary embodiment will now be described in more detail with reference to FIGS. 12 through 14.

Figure 12:
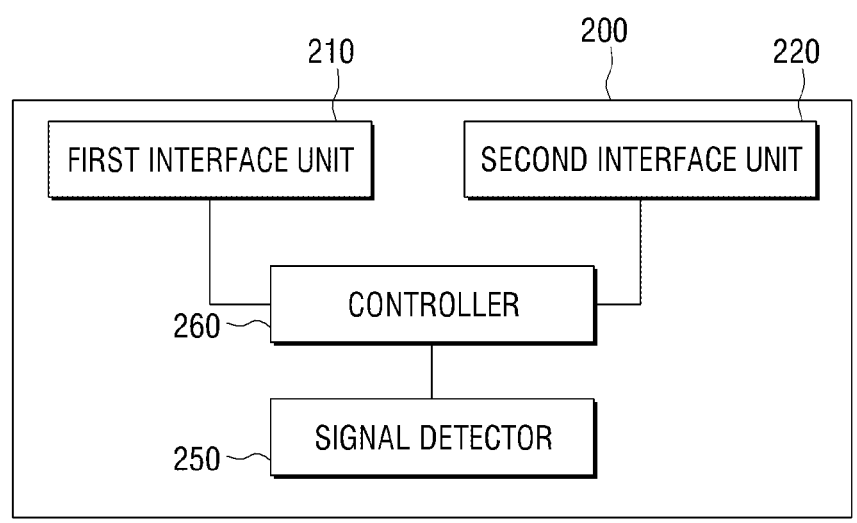
FIG. 12 is a block diagram illustrating a detailed structure of a repeater according to another exemplary embodiment.

FIG. 12 is a block diagram illustrating a detailed structure of a repeater 200 according to another exemplary embodiment. Referring to FIG. 12, the repeater 200 includes first and second interface units 210 and 220, a signal detector 250, and a controller 260. The same reference numerals of FIG. 12 as those of FIGS. 2, 3 and 5 perform the same functions, and thus repeated detailed descriptions will be omitted.

The first and second interface units 210 and 220 may communicate with a gateway apparatus and a client device, respectively, by using channels of a particular frequency band defined according to a Wi-Fi communication protocol. Here, the particular frequency band may refer to an ISM frequency band within a frequency band of 5 GHz defined according to the Wi-Fi communication protocol.

The signal detector 250 may detect frequency usage states of the particular frequency band and another frequency band. In detail, the signal detector 250 may detect whether an ISM frequency band and a DFS frequency band are used by another device, according to whether signals are received from an ISM frequency band and a DFS frequency band within a frequency band of 5 GHz defined according to the Wi-Fi communication protocol. Here, the another device may include another repeater, a military radar, a weather radar, a radio navigation radar, a satellite radar, etc.

If the frequency usage state is detected in the particular frequency band, the controller 260 may control at least one of the first and second interface units 210 and 220 to use channels of the particular frequency band and the another frequency band.

Here, the particular frequency band may include a lower frequency band corresponding to the first interface unit 210, and the another frequency band may include an upper frequency band corresponding to the second interface unit 220. Also, the lower and upper frequency bands may respectively include some channels of a DFS frequency band and some channels of a non-DFS frequency band.

Alternatively, the particular frequency band may include an upper frequency band corresponding to the first interface unit 210, and the another frequency band may include a lower frequency band corresponding to the second interface unit 220. Again, the lower and upper frequency bands may respectively include some channels of a DFS frequency band and some channels of a non-DFS frequency band.

In addition, different frequency bands respectively used by the first and second interface units 210 and 220 may be spaced apart from each other by the preset number of channels or a preset frequency band in order to reduce inter-channel interference with another repeater.

In detail, the particular frequency band may refer to an ISM frequency band within a frequency band of 5 GHz defined according to the Wi-Fi communication protocol, and the other frequency band may refer to a DFS frequency band within a frequency band 5 GHz defined according to the Wi-Fi communication protocol.

Also, if the frequency usage state is detected in the particular frequency band, the controller 260 may control at least one of the first and second interface units 210 and 220 to use channels which use a frequency band spaced apart from a frequency band used by channels of the particular frequency band.

If the signal detector 230 detects a signal which uses a frequency within the other frequency band, the controller 260 may restrict the first and second interface units 210 and 220 to using of the frequency band used by the signal. In other words, the controller 260 may control at least one of the first and second interface units 210 and 220 to use channels which are not used by another device in a DFS frequency band. The above-described operation of the controller 260 will be described in more detail with reference to FIG. 13.

The first and second interface units 210 and 220 may respectively further include at least one BPF which filters a particular frequency band and another frequency band, respectively.

Also, the first and second interface units 210 and 220 may respectively include at least one antenna having a resonant frequency which is tuned through channels of the particular frequency band and channels of the another frequency band.

Here, the particular frequency band may refer to an ISM frequency band within a frequency band of 5 GHz defined according to the Wi-Fi communication protocol, and the another frequency band may refer to a DFS frequency band within a frequency band of 5 GHz defined according to the Wi-Fi communication protocol.

The repeater 200 may further include a shield which ground-shields the first and second interface units 210 and 220.

These exemplary embodiments are as described in detail with reference to FIGS. 3 through 7.

Figure 13:
FIG. 13 shows tables illustrating channels used for wireless communications in an ISM frequency band and a DFS frequency band according to an exemplary embodiment.

FIG. 13 shows tables (a) and (b) comparing channels used for wireless communications in an ISM frequency band, and channels used for wireless communications in an ISM frequency band and a DFS frequency band according to an exemplary embodiment. The table (a) of FIG. 13 illustrates channels used for wireless communications in an ISM frequency band as described with reference to FIG. 10.

The table (b) of FIG. 13 illustrates channels used for wireless communications in an ISM frequency band and a DFS frequency band. As shown table (b) of FIG. 13, a gateway apparatus, a repeater, and a client device may receive and transmit a broadcast signal by using an ISM frequency band, i.e., frequency bands between 5.15 GHz and 5.25 GHz, and between 5.725 GHz and 5.825 GHz, a DFS frequency band, i.e., a frequency band between 5.25 GHz and 5.725 GHz.

The controller 260 may control the first and second interface units 210 and 220 to use channels Ch. 52, Ch. 56, Ch. 60, Ch. 64, Ch. 124, Ch. 128, Ch. 136, and Ch. 140 which respectively have a bandwidth of 20 MHz and center frequencies 5260 MHz, 5280 MHz, 5300 MHz, 5320 MHz, 5620 MHz, 5640 MHz, 5680 MHz, and 5700 MHz.

Therefore, a first interface unit of a repeater, which receives a broadcast signal from a gateway apparatus, may use lower frequency bands between 5.15 GHz and 5.25 GHz and between 5.25 GHz and 5.30 GHz corresponding to the first interface unit. Also, a second interface unit of the repeater, which transmits the broadcast signal to a client device, may use frequency bands between 5.610 GHz and 5.650 GHz, between 5.670 GHz and 5.710 GHz, and between 5.25 GHz and 5.725 GHz corresponding to the second interface unit. In other words, lower and upper frequency bands may include some channels of a DFS frequency band and some channels of a non-DFS frequency band.

For example, the first interface unit 210 may receive a broadcast signal from a gateway apparatus by using channels Ch. 36 and Ch. 40 of an ISM frequency band lower than a DFS frequency band. Also, the second interface unit 220 may transmit the broadcast signal to a client device by using channels Ch. 149 and Ch. 153 of an ISM frequency band upper than the DFS frequency band.

If a usage state of the ISM frequency band is detected in this case, i.e., another repeater uses channels Ch. 44 and Ch. 48, and channels Ch. 157 and Ch. 161, the controller 260 may control at least one of the first and second interface units 210 and 220 to use a DFS frequency band.

In more detail, the controller 260 may control at least one of the first and second interface units 210 and 220 to use channels, which are spaced apart from channels used by another repeater, from among other channels defined within the DFS frequency band. In the above-described example, the controller 260 may control the first interface unit 210 to use channels Ch. 60 and Ch. 64 in the DFS frequency band and control the second interface unit 220 to use channels Ch. 136 and Ch. 140 in the DFS frequency band.

Therefore, channels spaced apart from channels used by another repeater may be used, thereby minimizing adjacent channel interference.

If another device uses channels Ch. 136 and Ch. 140 in a DFS frequency band, the controller 260 may control the second interface unit 220 to limit usage of channels used by the another device and to use channels Ch. 124 and Ch. 128.

Figure 14:
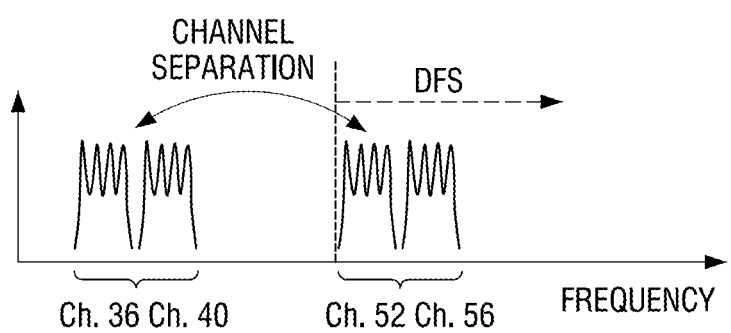
FIG. 14 is a graph illustrating a method of excluding an adjacent channel interference according to an exemplary embodiment.

FIG. 14 is a view illustrating a method of excluding an adjacent channel interference according to an exemplary embodiment. As shown in FIG. 14, if two or more repeaters are used, a repeater according to an exemplary embodiment may use a frequency band which is spaced apart from a frequency band used by another repeater by the preset number of channels, or a preset frequency band, in order to reduce channel interference with the other repeater.

In other words, in order to exclude adjacent channel interference, some channels Ch. 52 and Ch. 56 of a DFS frequency band may be used to minimize adjacent channel interference with another repeater.

Figure 15:
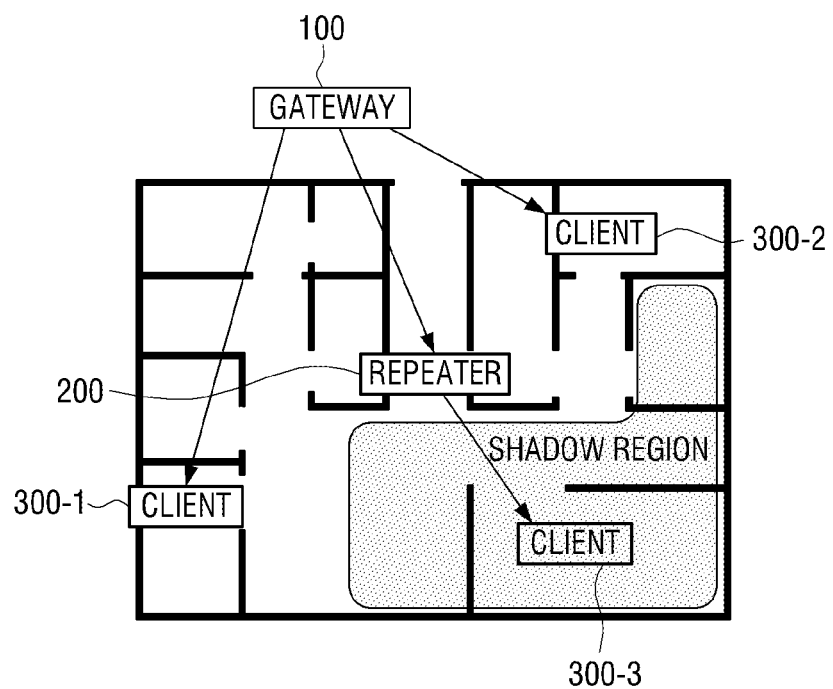
FIG. 15 is a view schematically illustrating a method of transmitting a broadcast signal among a gateway apparatus, a repeater, and a client device according to an exemplary embodiment.

FIG. 15 is a view schematically illustrating a method of transmitting a broadcast signal among a gateway apparatus, a repeater, and a client device according to an exemplary embodiment. As shown in FIG. 15, a client device 300-3 is positioned in a shadow area, i.e., a region in which a transmission rate of a broadcast signal between a gateway apparatus 100 and the client apparatus 300-3 is lower than 20 Mbps or 30 Mbps, may receive the broadcast signal amplified by the repeater.

Figure 16:
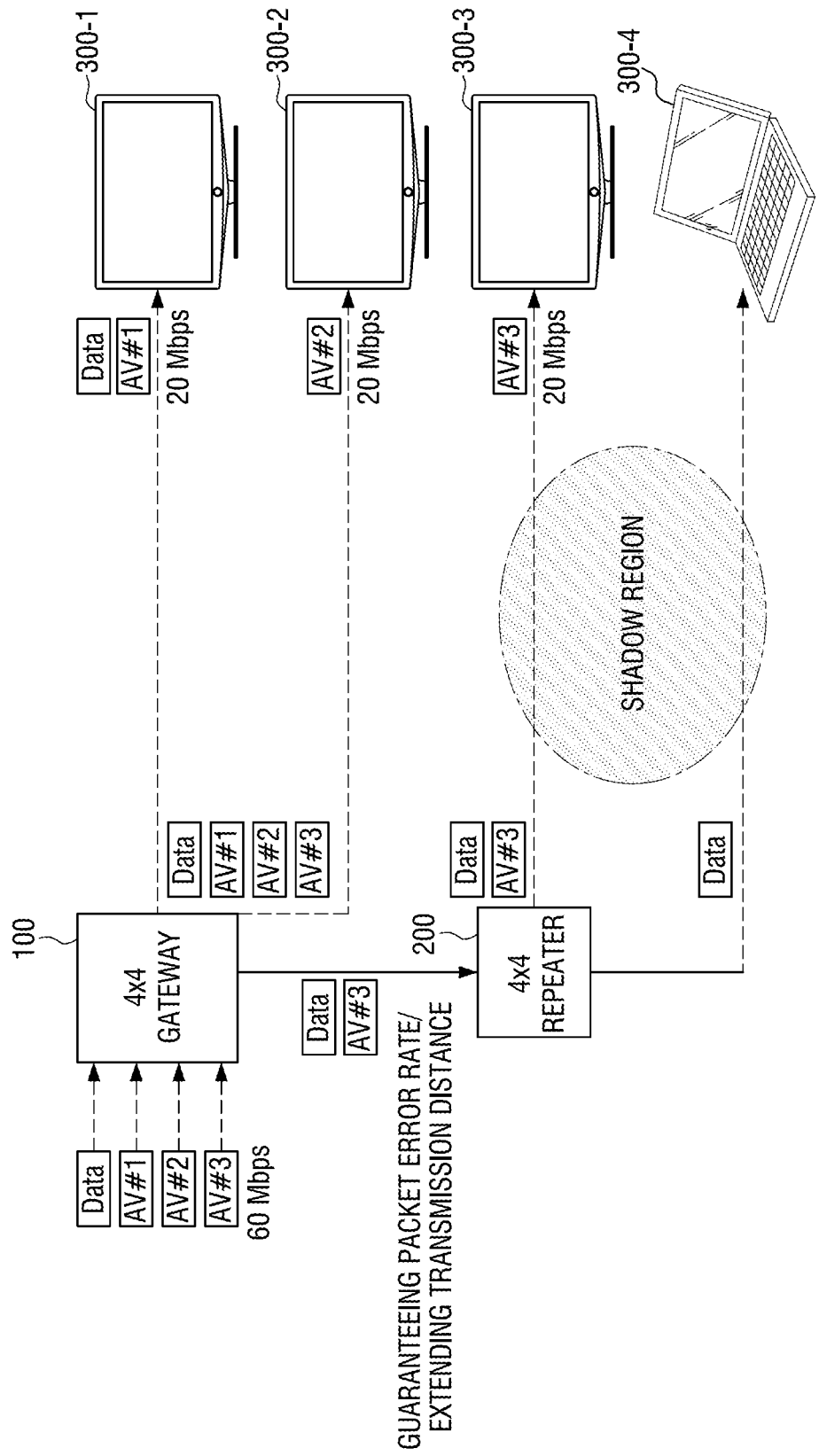
FIG. 16 is a view schematically illustrating a method of transmitting a broadcast signal among a gateway apparatus, a repeater and a client device according to another exemplary embodiment.

FIG. 16 is a view schematically illustrating a method of transmitting a broadcast signal among a gateway apparatus, a repeater and a client device according to an exemplary embodiment.

As shown in FIG. 16, a gateway apparatus 100 receives a broadcast signal and a data signal from an external device and transmits the broadcast signal and the data signal to a repeater 200 and a plurality of client devices 300-1, 300-2, 300-3, and 300-4 which are installed in a home.

In detail, the gateway apparatus 100 may convert a broadcasting signal, which is received from a corresponding channel according to a channel selecting command received from the plurality of client devices 300-1, 300-2, and 300-3, into an MPEG-2 TS format and transmit the converted broadcast signal by using a frequency band of 5 GHz, which is defined according to a Wi-Fi communication protocol. The gateway apparatus 100 may transmit the data signal by using a frequency band of 2.4 GHz which is defined according to the Wi-Fi communication protocol.

In this case, the gateway apparatus 100 may use 4×4 multiple-input multiple-output (MIMO) technology capable of transmitting four additional streams in order to transmit the broadcast signal and the data signal.

In order to provide seamless digital broadcasting to a user, a broadcast signal transmitted between the client device 300 and the gateway apparatus 100 is to satisfy a fixed transmission rate between 20 Mbps and 30 Mbps, or more.

Therefore, for the client devices 300-3 and 300-4 positioned in an area in which a fixed transmission rate is difficult to attain, the repeater 200 amplifies the broadcast signal or the data signal received from the gateway apparatus 100 and transmits the amplified broadcast signal or data signal to the client devices 300-3 and 300-4.

In this case, the repeater 200 may differently operate a first channel which receives the broadcast signal from the gateway apparatus 100, and a second channel which transmits the broadcast signal to the client device 300-3.

In detail, the repeater 200 may receive the broadcast signal from the gateway apparatus 100 by using an ISM frequency band higher than a DFS frequency band within a frequency band of 5 GHz and transmit the broadcast signal to the client device 300 by using an ISM frequency band lower than the DFS frequency band.

In this case, the repeater 200 may include a BPF, a high Q ceramic antenna, and a shield in order to reduce interference which occurs when transmitting the broadcast signal by using different channels.

In the above-described exemplary embodiment, the repeater 200 receives the broadcast signal from the gateway apparatus 100 by using the ISM frequency band higher than the DFS frequency band and transmits the broadcast signal to the client device 300 by using the ISM frequency band lower than the DFS frequency band. However, this is only an example. In other words, the repeater 200 may receive the broadcast signal from the gateway apparatus 100 by using an ISM frequency band lower than a DFS frequency band and transmit the broadcast signal to the client device 300 by using an ISM frequency band higher than the DFS frequency band.

Also, if two or more repeaters are used, the repeater 200 may use a channel, which is spaced apart from transmitting and receiving channels used by another repeater, by using the DFS frequency band.

Figure 17:
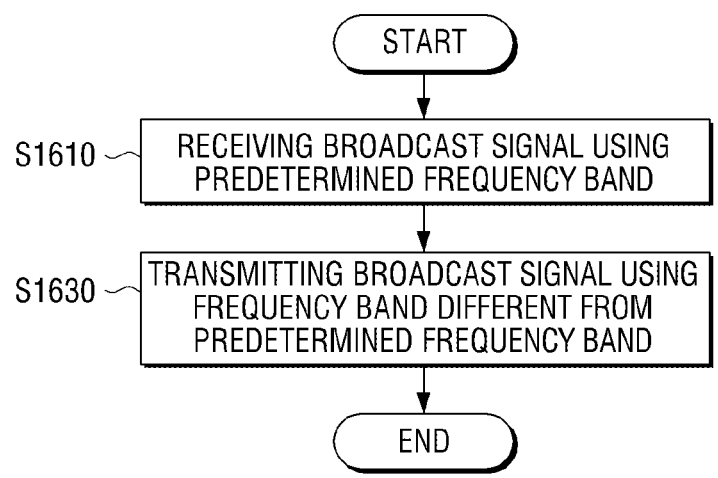
FIG. 17 is a flowchart illustrating a method of relaying a broadcast signal between a gateway apparatus and a client device according to an exemplary embodiment.

FIG. 17 is a flowchart illustrating a method of relaying a broadcast signal between a gateway apparatus and a client device according to an exemplary embodiment.

In operation S1610, a broadcast signal is received from a gateway apparatus by using a preset frequency band.

In operation S1620, the broadcast signal is transmitted to a client device by using a frequency band different from the preset frequency band.

Here, the preset frequency band and the different frequency band may be included in an ISM frequency band within a frequency band of 5 GHz, which is defined according to a Wi-Fi communication protocol.

In detail, the preset frequency band may be included in an ISM frequency band higher than a DFS frequency band defined within a frequency band of 5 GHz, and the different frequency band may be included in an ISM frequency band lower than the DFS frequency band. Also, the preset frequency band may be included in an ISM frequency band lower than a DFS frequency band defined within a frequency band of 5 GHz, and the different frequency band may be included in an ISM frequency band higher than the DFS frequency band.

The present inventive concept can also be embodied as computer readable codes on a computer readable recording medium. The computer readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network coupled computer systems so that the computer readable code is stored and executed in a distributed fashion.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A repeater comprising:
a first interface unit configured to be connected to a gateway apparatus via a Wi-Fi communication protocol over a channel in a first frequency band, the first interface comprising a first filter configured to filter the first frequency band to reduce signal noise from frequencies outside of the first frequency band; and
a second interface unit configured to be connected to a client device via the Wi-Fi communication protocol over a channel in a second frequency band, the second interface comprising a second filter configured to filter the second frequency band to reduce signal noise from frequencies outside of the second frequency band,
wherein the first frequency band is a different frequency band from the second frequency band,
wherein the first and the second frequency bands are spaced apart from each other by a preset number of channels or a preset frequency band, and
wherein one of the first frequency band and the second frequency band comprises a frequency band higher than a dynamic frequency selection (DFS) frequency band and the other one of the first frequency band and the second frequency band comprises a frequency band lower than the DFS frequency band.

2. The repeater as claimed in claim 1, wherein the first frequency band comprises a lower frequency band and the second frequency band comprises an upper frequency band.

3. The repeater as claimed in claim 1, wherein the first and the second frequency bands are in an Industrial, Scientific and Medical (ISM) frequency band.

4. The repeater as claimed in claim 1, wherein the first frequency band comprises a lower frequency band and the second frequency band comprises an upper frequency, wherein the lower and upper frequency bands respectively comprise channels of the dynamic frequency selection (DFS) frequency band and channels of a non-DFS frequency band.

5. The repeater as claimed in claim 1, wherein the first and the second frequency bands are respectively in an Industrial, Scientific and Medical (ISM) frequency band higher than the DFS frequency band defined within a frequency band of 5 GHz and an ISM frequency band lower than the DFS frequency band.

6. The repeater as claimed in claim 1, wherein the first filter comprises at least one band-pass filter.

7. The repeater as claimed in claim 1, wherein the first interface unit further comprises at least one first antenna which has a resonant frequency tuned to the first frequency band, and
wherein the second interface unit further comprises at least one second antenna which has a resonant frequency tuned to the second frequency band.

8. The repeater as claimed in claim 7, wherein:
the first and the second frequency bands are respectively in an Industrial, Scientific and Medical (ISM) frequency band higher than the DFS frequency band defined within a frequency band of 5 GHz and an ISM frequency band lower than the DFS frequency band; and
the first antenna is a ceramic antenna having a Q value greater than a preset Q value.

9. The repeater as claimed in claim 1, further comprising a shield configured to ground-shield the first and second interface units.

10. A repeater comprising:
first and second interface units respectively configured to communicate with a gateway apparatus and a client device via channels within a first frequency band and second frequency band which is defined according to a Wi-Fi communication protocol,
wherein the first interface unit comprises a first filter configured to filter the first frequency band to reduce signal noise from frequencies outside of the first frequency band, and the second interface unit comprises a second filter configured to filter the second frequency band to reduce signal noise from frequencies outside of the second frequency band, and
wherein the first frequency band is a different frequency band from the second frequency band;
a signal detector configured to detect a frequency usage state of the particular frequency band; and
a controller configured to control, when the frequency usage state of the particular frequency band detected by the signal detector indicates that the particular frequency band is being used, at least one of the first and second interface units to use channels of the respective first and second frequency bands, wherein the first and second frequency bands are different from the particular frequency band,
wherein the first and the second frequency bands are spaced apart from each other by a preset number of channels or a preset frequency band, and
wherein one of the first frequency band and the second frequency band comprises a frequency band higher than a dynamic frequency selection (DFS) frequency band and the other one of the first frequency band and the second frequency band comprises a frequency band lower than the DFS frequency band.

11. The repeater as claimed in claim 10, wherein the signal detector is further configured to detect a frequency usage state of the first and second frequency bands, and wherein when the signal detector detects a signal which uses a frequency within the first or second frequency bands, the controller is further configured to control the respective first and second interface units to use a frequency band of the signal.

12. The repeater as claimed in claim 10, wherein:
the second frequency band is in an Industrial, Scientific and Medical (ISM) frequency band within a frequency band of 5 GHz defined according to the Wi-Fi communication protocol; and
the first frequency band is in the DFS frequency band within a frequency band of 5 GHz defined according to the Wi-Fi communication protocol.

13. The repeater as claimed in claim 10, wherein each of the first and the second filter comprise at least one band-pass filter.

14. The repeater as claimed in claim 10, wherein each of the first interface unit further comprises at least one first antenna which has a resonant frequency tuned to channels of the first frequency band, and
wherein the second interface unit further comprises at least one second antenna which has a resonant frequency tuned to channels of the second frequency band.

15. The repeater as claimed in claim 10, further comprising a shield configured to ground-shield the first and second interface units.

16. A method of controlling a repeater which communicates with a gateway apparatus via a first Wi-Fi connection, and which communicates with at least one client device via a second Wi-Fi connection, the method comprising:
filtering over a first bandwidth of a first frequency band centered on a first center frequency to reduce signal noise from frequencies outside of the first frequency band;
filtering over a second bandwidth of a second frequency band centered on a second center frequency to reduce signal noise from frequencies outside of the second frequency band;
receiving a broadcast signal from the gateway apparatus, wherein the broadcast signal is received over the first frequency band via the first Wi-Fi connection; and
transmitting the received broadcast signal to a client device from among the at least one client device over a second frequency band via the second Wi-Fi connection,
wherein the first frequency band is a different frequency band from the second frequency band, and
wherein the first and the second frequency bands are spaced apart from each other by a preset number of channels or a preset frequency band, and
wherein one of the first frequency band and the second frequency band comprises a frequency band higher than a dynamic frequency selection (DFS) frequency band and the other one of the first frequency band and the second frequency band comprises a frequency band lower than the DFS frequency band.

* * * * *